(12) United States Patent
Gangel et al.

(10) Patent No.: US 12,194,473 B2
(45) Date of Patent: Jan. 14, 2025

(54) MATERIAL REDUCTION MACHINE WITH SILENCED CHUTE

(71) Applicant: Vermeer Manufacturing Company, Pella, IA (US)

(72) Inventors: Scott Edward Gangel, Bussey, IA (US); Mason Carl Prieksat, Pella, IA (US); Stephen Daining, Pella, IA (US); Adam James Parker, Altoona, IA (US)

(73) Assignee: Vermeer Manufacturing Company, Pella, IA (US)

( * ) Notice: Subject to any disclaimer, the term of this patent is extended or adjusted under 35 U.S.C. 154(b) by 234 days.

(21) Appl. No.: 17/893,557

(22) Filed: Aug. 23, 2022

(65) Prior Publication Data

US 2023/0066254 A1 Mar. 2, 2023

Related U.S. Application Data

(60) Provisional application No. 63/237,761, filed on Aug. 27, 2021.

(51) Int. Cl.
*B27L 11/08* (2006.01)
*A01G 3/00* (2006.01)
(Continued)

(52) U.S. Cl.
CPC .......... *B02C 18/2216* (2013.01); *A01G 3/002* (2013.01); *B27L 11/08* (2013.01); *G10K 11/162* (2013.01)

(58) Field of Classification Search
CPC ........ B27L 11/00; B27L 11/002; B27L 11/02; B27L 11/04; A01G 3/002
See application file for complete search history.

(56) References Cited

U.S. PATENT DOCUMENTS 3,851,724 A * 12/1974 Banks, Jr. .............. G10K 11/16
181/208
4,015,683 A 4/1977 Williams
(Continued)

FOREIGN PATENT DOCUMENTS

CN 108421606 A 8/2018
JP 2005088369 A 4/2005
(Continued)

OTHER PUBLICATIONS

Polymer Technologies Inc., "Acoustic Foam Materials for Insulation and Sound Absorption", <https://www.polytechinc.com/products/acoustic-foam>, publicly available at least as early as Aug. 2020, 22 pages.

(Continued)

*Primary Examiner* — Matthew Katcoff
(74) *Attorney, Agent, or Firm* — Michael Best & Friedrich LLP

(57) ABSTRACT

A material reduction machine includes an infeed portion operable to receive material to be reduced, and a cutting mechanism operable to reduce material fed in from the infeed portion. An outlet chute has a first end operable to receive the material reduced by the cutting mechanism and a second end operable to discharge the reduced material from the machine, wherein the outlet chute extends along a curved path. The outlet chute includes, along a radially-inner side of the curved path, a foraminous interior wall providing communication with a sound attenuation layer.

23 Claims, 14 Drawing Sheets

(51) Int. Cl.
  *B02C 18/22* (2006.01)
  *G10K 11/162* (2006.01)

(56) References Cited

U.S. PATENT DOCUMENTS

| | | | |
|---|---|---|---|
| 4,442,877 | A | 4/1984 | Uitermarkt |
| 5,042,108 | A | 8/1991 | Yamazumi et al. |
| 5,088,532 | A | 2/1992 | Eggers et al. |
| 5,692,548 | A | 12/1997 | Bouwers et al. |
| 5,692,549 | A | 12/1997 | Eggers |
| 6,138,932 | A | 10/2000 | Moore |
| 6,250,450 | B1 | 6/2001 | Howard |
| 6,257,511 | B1 * | 7/2001 | Turner .................. B02C 18/18 241/296 |
| 6,324,720 | B1 | 12/2001 | Beckey et al. |
| 7,011,258 | B2 | 3/2006 | O'Halloran et al. |
| 7,546,964 | B2 | 6/2009 | Bouwers |
| 7,637,444 | B2 | 12/2009 | Stelter et al. |
| 7,909,275 | B2 * | 3/2011 | Gross .................. B27L 11/02 241/101.76 |
| 8,039,075 | B2 | 10/2011 | Malmberg |
| 8,684,291 | B2 | 4/2014 | Galloway et al. |
| 10,350,608 | B2 | 7/2019 | Helland |
| 10,507,469 | B2 * | 12/2019 | Schie .................. B02C 18/2283 |
| 10,654,424 | B2 * | 5/2020 | Sim .................. B32B 15/20 |
| 11,173,496 | B2 * | 11/2021 | Bramley ............. B02C 18/2283 |
| 2004/0182673 | A1 | 9/2004 | Baller |
| 2014/0031185 | A1 | 1/2014 | Bradley et al. |
| 2017/0320067 | A1 | 11/2017 | Helland |

FOREIGN PATENT DOCUMENTS

| | | |
|---|---|---|
| JP | 2007175676 A | 7/2007 |
| WO | 2018187848 A1 | 10/2018 |

OTHER PUBLICATIONS

Polymer Technologies Inc., "Acoustic Barrier Materials for Noise Reduction", <https://www.polytechinc.com/products/acoustic-barriers>, publicly available at least as early as Aug. 2020, 10 pages.
McNichols, "McNichols® Perforated Metal", <https://www.mcnichols.com/perforated-metal>, publicly available at east as early as Aug. 2020, 7 pages.
McNichols, "McNichols® Expanded Metal", <https://www.mcnichols.com/expanded-metal>, publicly available at east as early as Aug. 2020, 7 pages.
ASGCO, "ASGCO 3-DEM Chute Analysis Program", <https://www.asgco.com/products/3-dem-chute-analysis>, website accessed Apr. 6, 2020, 4 pages.
Weba, "Chute Systems & Solutions", <https://www.webacutes.com/services/engineered-design/>, website accessed Apr. 6, 2020, 6 pages.
European Patent Office Action for Related Application No. 22192236.2 dated Jan. 10, 2023 (5 pages).

* cited by examiner

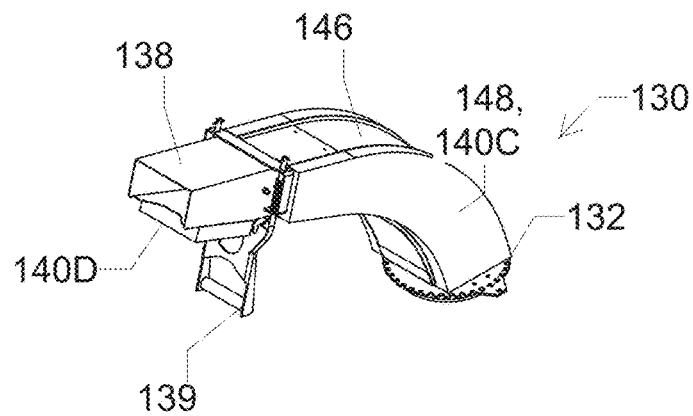
FIG. 5
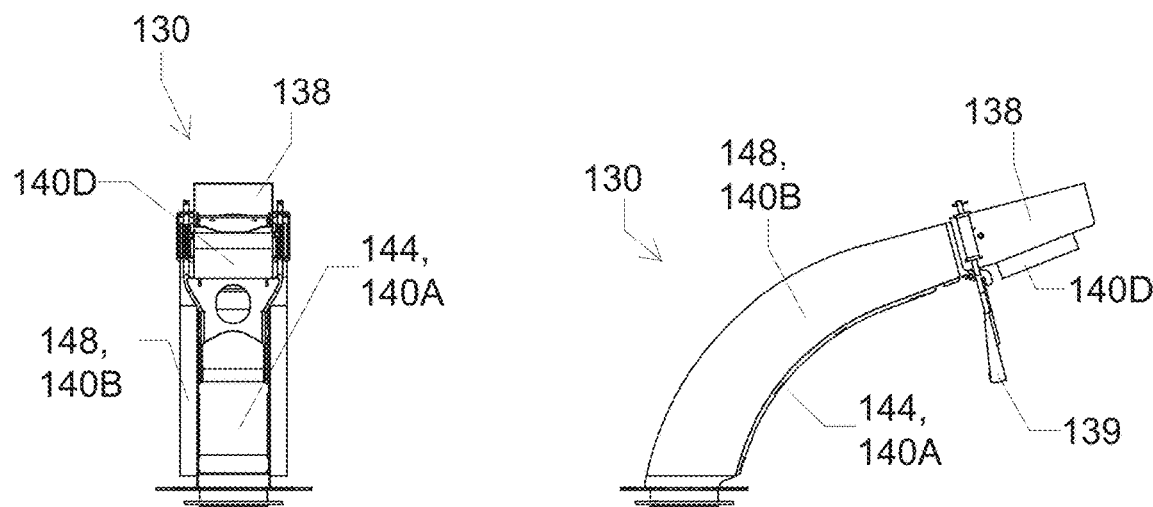
FIG. 6
FIG. 7
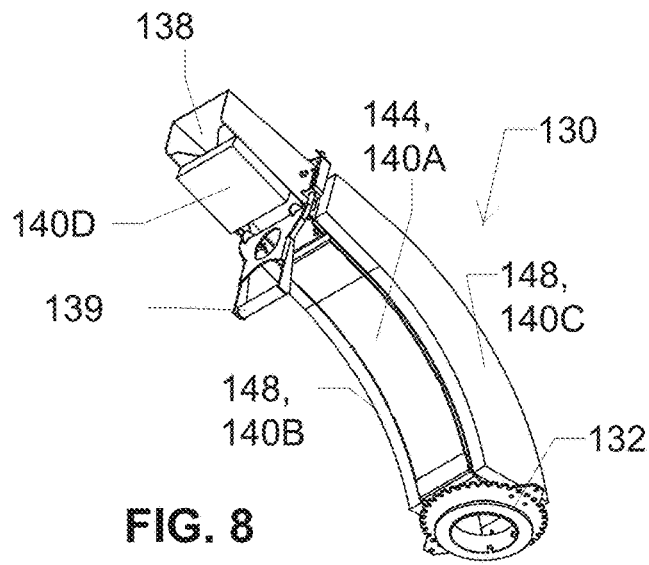
FIG. 8

MATERIAL REDUCTION MACHINE WITH SILENCED CHUTE

CROSS-REFERENCE TO RELATED APPLICATIONS

This application claims the benefit of priority to U.S. Provisional Patent Application No. 63/237,761, filed on Aug. 27, 2021, the entire contents of which are incorporated by reference herein.

BACKGROUND

The present invention relates to material reduction machines, for example brush chippers, and more particularly to the construction of the discharge chute for outputting material from such material reduction machines.

Chippers typically contain sharp knives that cut material such as whole trees and branches into smaller woodchips. Example prior art chippers are shown in U.S. Pat. Nos. 10,350,608; 8,684,291; 7,637,444; 7,546,964; 7,011,258; 6,138,932; 5,692,549; 5,692,548; 5,088,532; and 4,442,877; and U.S. Publication No. 2014/0031185, each owned by Vermeer Manufacturing Company; these documents are each incorporated herein by reference in their entirety and form part of the current disclosure.

Chippers often include an outlet chute for discharging reduced material to a desired location. Some aspects of the present disclosure relate particularly to improved outlet chutes for chippers, and to chippers having improved noise control during operation.

SUMMARY

In one aspect, the invention provides a material reduction machine including an infeed portion operable to receive material to be reduced, and a cutting mechanism operable to reduce material fed in from the infeed portion. An outlet chute has a first end operable to receive the material reduced by the cutting mechanism and a second end operable to discharge the reduced material from the machine, wherein the outlet chute extends along a curved path. The outlet chute includes, along a radially-inner side of the curved path, a foraminous interior wall providing communication with a sound attenuation layer.

In another aspect, the invention provides a material reduction machine including an infeed portion operable to receive material to be reduced, and a cutting mechanism operable to reduce material fed in from the infeed portion. An outlet chute has a first end operable to receive the material reduced by the cutting mechanism and a second end operable to discharge the reduced material from the machine, wherein the outlet chute extends along a curved path. At least one lateral side of the outlet chute includes a foraminous interior wall providing communication with a sound attenuation layer.

In yet another aspect, the invention provides a material reduction machine including an infeed portion operable to receive material to be reduced, and a cutting mechanism operable to reduce material fed in from the infeed portion. An outlet chute has a first end provided by a base portion of the outlet chute and operable to receive the material reduced by the cutting mechanism and a second end operable to discharge the reduced material from the machine, wherein the outlet chute extends along a curved path. At the second end, the outlet chute includes a discharge deflector that is angle-adjustable with respect to the base portion to adjust the trajectory of the reduced material discharged therefrom, and the discharge deflector includes an integrated silencer.

BRIEF DESCRIPTION OF THE DRAWINGS

FIG. 5 is a perspective view of the assembled outlet chute of FIG. 4.

FIG. 6 is a front view of the outlet chute of FIG. 5.

FIG. 7 is a side elevation view of the outlet chute of FIG. 5.

FIG. 8 is a perspective view of the outlet chute of FIG. 5, from an underside thereof.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
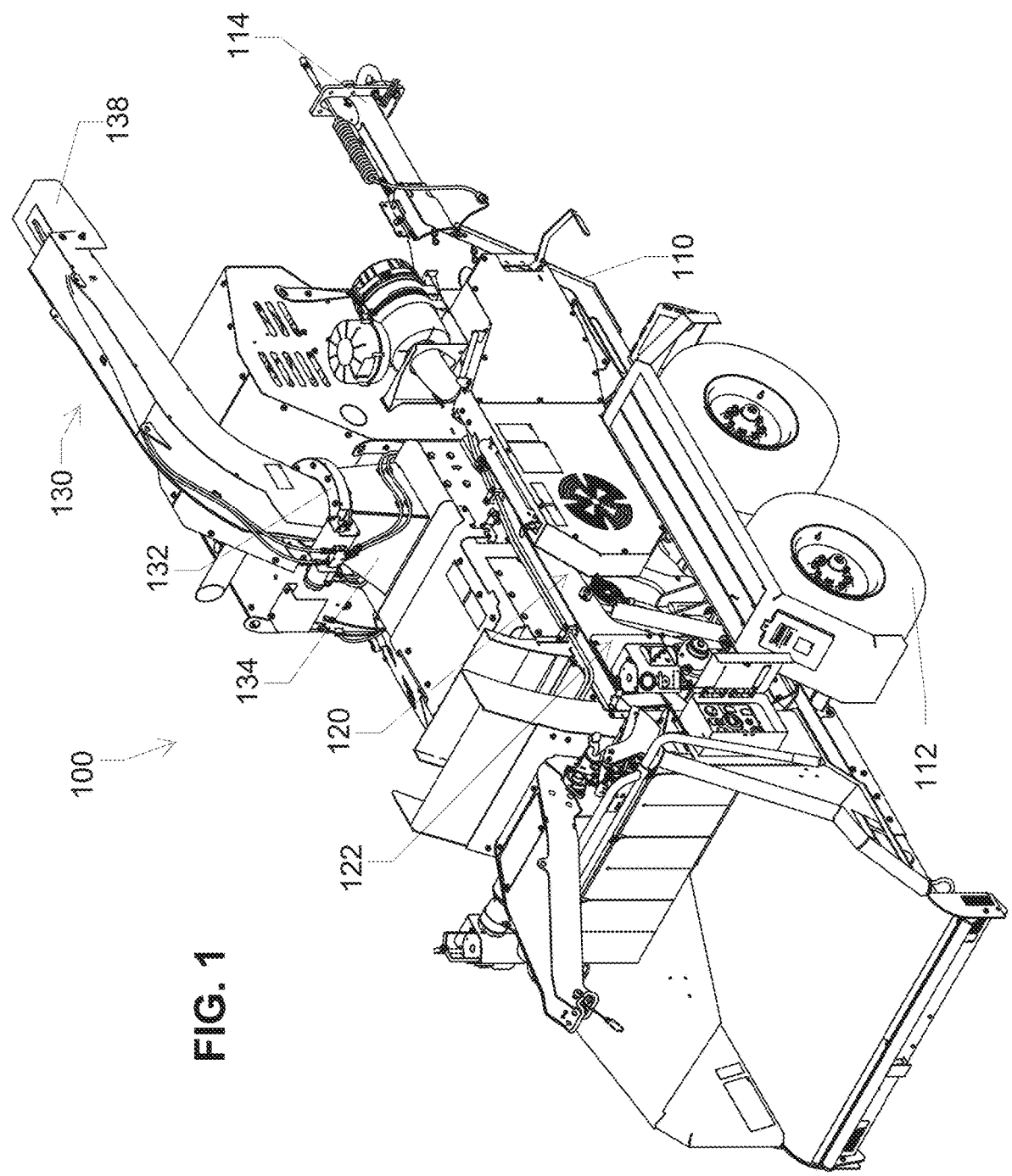
FIG. 1 is a perspective view of a chipper according to a conventional construction.
Figure 2:
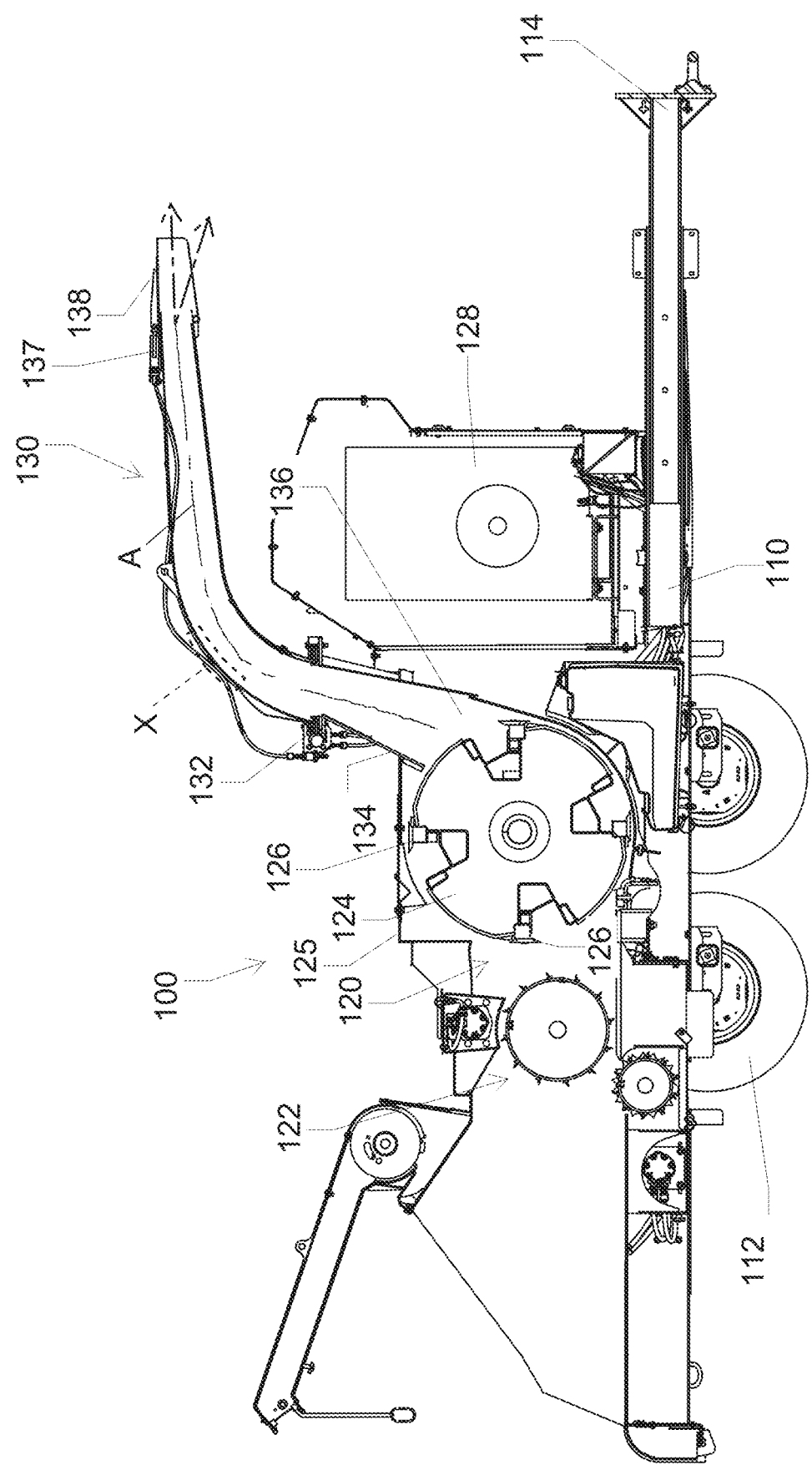
FIG. 2 is a side elevation view of the chipper of FIG. 1. Several components are removed so as to illustrate internal workings of the chipper.
Figure 21:
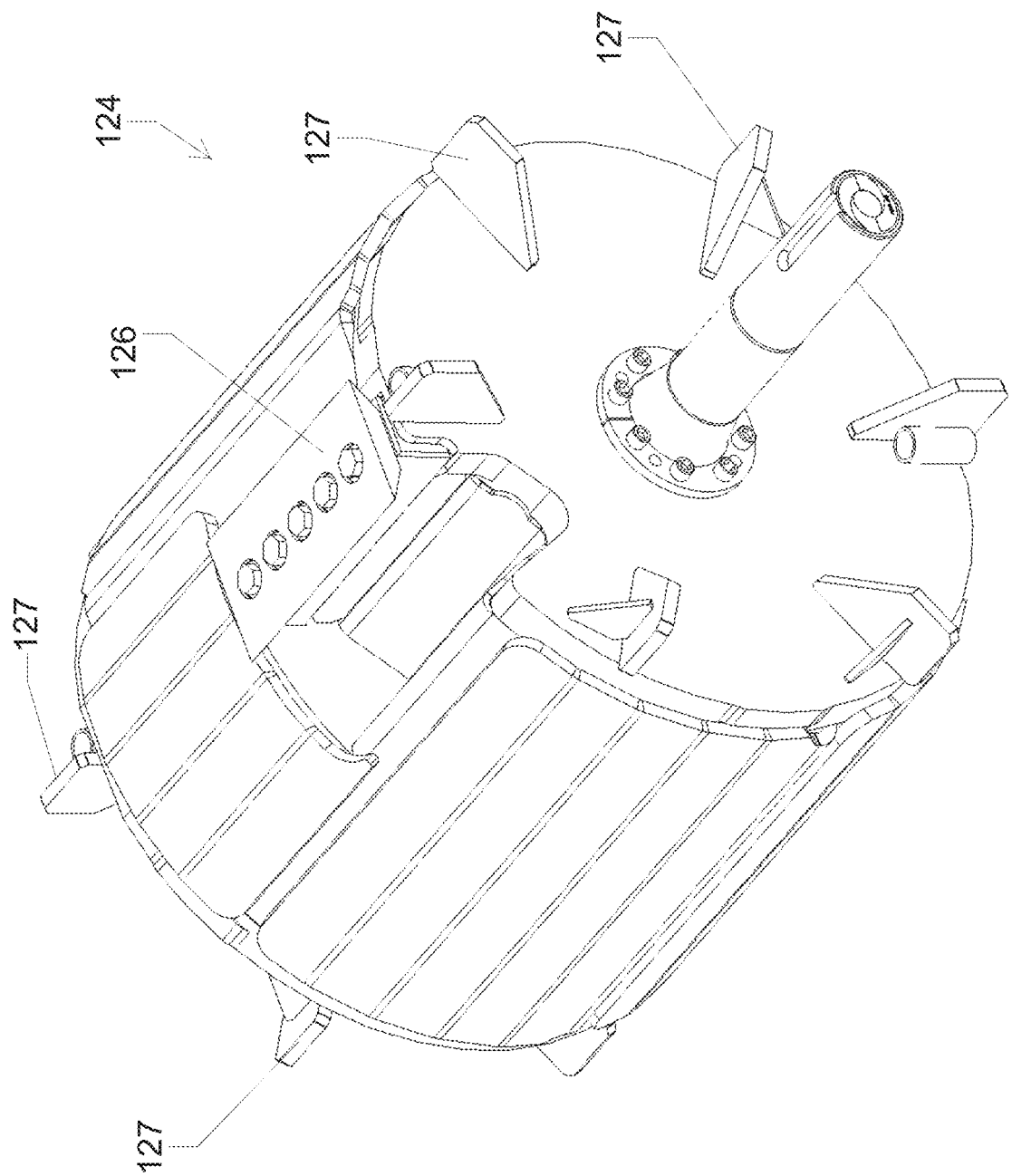
FIG. 21 is a perspective view of an exemplary cutting mechanism in isolation.

FIGS. 1 and 2 illustrate a material reduction machine, more particularly a chipper 100, according to one exemplary embodiment. The chipper 100 includes a processing portion 120 (FIG. 2) for processing material into smaller pieces and a discharge or outlet chute 130 for discharging comminuted material (e.g., biomass) away from the chipper 100. An infeed system 122 (e.g., one or more driven rollers) can actively feed material into the processing portion 120. A frame 110 of the chipper 100 includes ground supporting wheels 112 and a hitch 114 to allow travel and transport of the chipper 100. Mobility may not be desirable in all cases, however, and stationary embodiments having alternate constructions are also contemplated. As shown in FIG. 2, the processing portion 120 includes a cutting mechanism 124 such as a chipping or cutting drum having a plurality of knives 126 or a disk cutter. Cutting mechanisms are well known, and any appropriate cutting mechanism (whether now known or later developed) may be used to process material into smaller pieces. An exemplary drum forming the cutting mechanism 124 is shown in isolation in FIG. 21. In addition to the knives 126, the drum can include a plurality of vanes or paddles 127 that forcibly drive the ejection of cut/reduced material out of the processing portion 120 and into the outlet chute 130. The drum can physically throw the material and/or create increased air pressure (e.g., the vanes or paddles 127 acting as a centrifugal blower) to forcibly drive the material out into the outlet chute 130 with a forced airflow. Although there are other sources of noise, such as the noise generated by the reduction of the material within the processing portion 120, the material ejected from the processing portion 120 can define a primary impact area X along the outside of the curved path A of the outlet chute 130 described below. The cutting mechanism 124 is driven by a prime mover 128, such as an internal combustion engine (e.g., gasoline or diesel) or an alternative power source(s), such as one or more electric motors, alone or in a hybrid drivetrain with a fuel-burning engine. The cutting mechanism 124 can be directly or indirectly driven by the prime mover 128.

Figure 3:
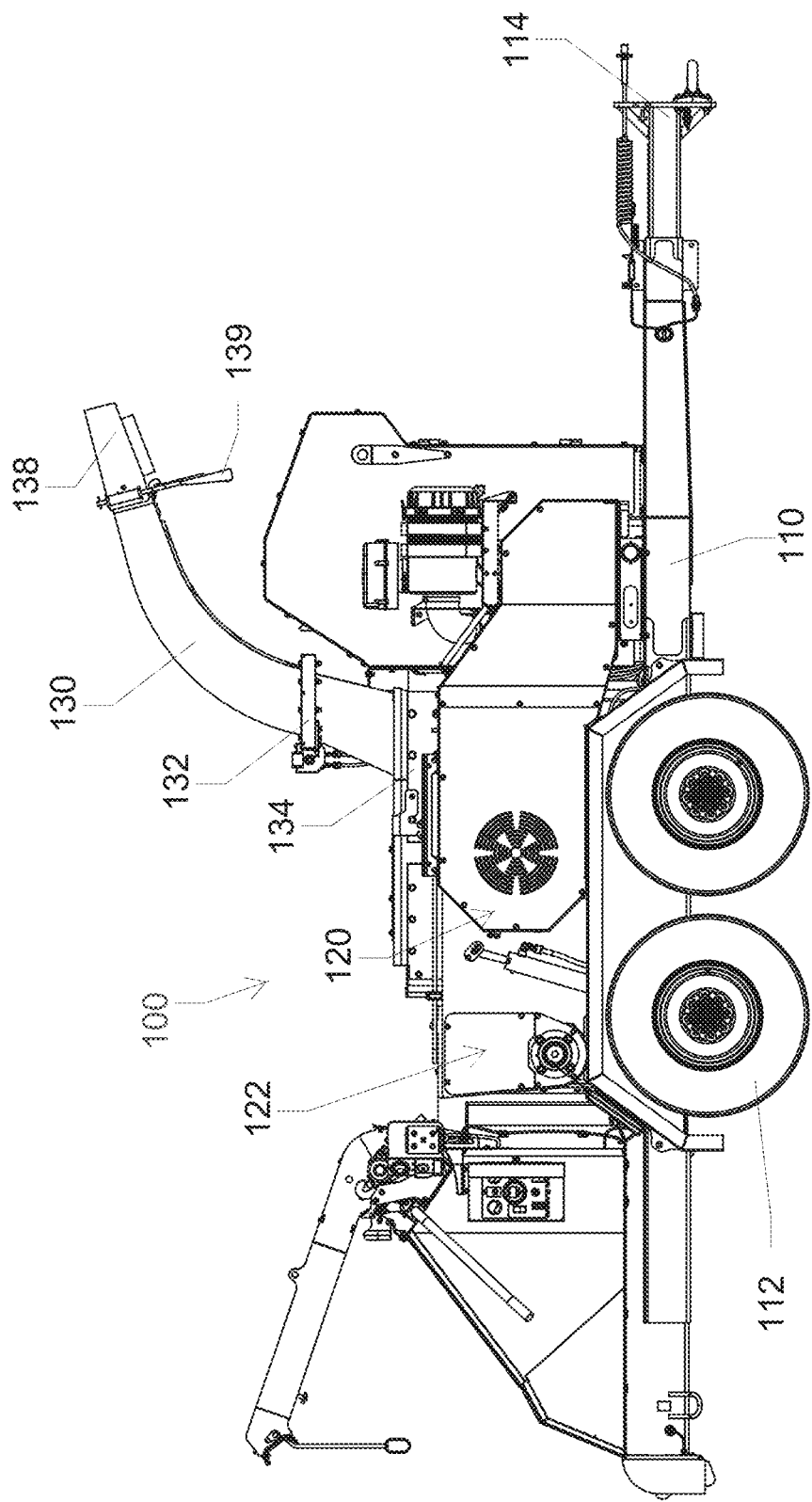
FIG. 3 is a side elevation view of a chipper similar to that of FIGS. 1 and 2, but having a noise-reducing outlet chute according to one embodiment of the present disclosure.

The outlet chute 130 forms part of an outfeed portion directly downstream of the processing portion 120 for material to be blown upward and outward away from the chipper 100. The outlet chute 130 can be removably attached (e.g., at the joint. 132) to join with a discharge neck 134 that is provided directly adjacent a downstream side of the cutting mechanism 124. More particularly, an upstream end of the outlet chute 130 joins with an outlet chamber 136 of the discharge neck 134. The discharge neck 134 can be separate from or integral with a cutter housing 125 that surrounds or encloses a majority of the cutting mechanism 124. The chute 130 is movable about the joint 132 to change the direction of discharged material. For example, the outlet chute 130 can pivot at the joint 132 about a substantially vertical axis (e.g., perpendicular to the ground+/−10 degrees). The outlet chute 130 defines an outlet or discharge path A for comminuted material to exit the chipper 100 from the processing portion 120, and the discharge path A is a curved path, as shown in side elevation (FIG. 2). The curved path A defines a single primary turn that redirects the material from a primarily vertical travel path to a primarily horizontal path. The magnitude of the path redirection can be about 45 to 80 degrees. In addition to the primary turn, the distal end of the outlet chute 130 can include a discharge deflector 138. The discharge deflector 138 can be movable on the outlet chute 130 to change the vertical trajectory of the reduced material as it is ejected, e.g., through an actuator, such as a hydraulic actuator 137 (FIG. 2), or by manipulation of a lever 139 (FIG. 3) with a handle that is coupled to a latching system and operable to various positions to pivot the discharge deflector 138 on the outlet chute 130. The orientation of the outlet chute 130 and/or the orientation of the discharge deflector 138 can be power-actuated and remotely controlled, either from the operation station control panel located away from the outlet chute 130 or a remote control (wired or wireless) that allows the operator to stand away from the chipper 100. In some constructions, the outlet chute 130 can be manually manipulated by the handle of the lever 139 to different positions about the joint 132.

In order to alleviate noise distribution during operation of the chipper 100, the chipper 100 is provided with at least one silencer 140 (e.g., three silencers 140A, 140B, 140C) integrated into the outlet chute 130. The outlet chute 130 necessarily provides an open path to the surrounding environment, extending directly from the processing portion 120, thus there is a significant amount of the externally-observed noise that is carried out through the outlet chute 130. In combination with or as a substitute for re-engineering the processing portion 120 to generate less noise during material reduction, the outlet chute 130 can operate simultaneously as a material exit passageway and a muffler or silencer. Details of this aspect of the outlet chute 130, according to a first embodiment shown in FIGS. 3-10, are described in further detail below.

As shown in FIGS. 4-8, the outlet chute 130 has a four-sided construction, or four-sided cross-section shape. The four sides can form a rectangle in cross-section (taken perpendicular to the path A at any point), but can alternately have unmatched side lengths and/or non-perpendicular angles between adjacent sides. The four sides of the outlet chute 130 consist of an inner wall 144, an outer wall 146, and two side walls 148, the side walls 148 connecting the inner and outer walls 144, 146 on either side. Although the walls 144, 146, 148 are flat, owing to the rectangular configuration, it is also noted that one or more of the walls 144, 146, 148 can be rounded, and in some constructions the outlet chute 130 has a round (e.g., circular) cross-sectional shape. The inner wall 144 is positioned along the inside of the curved path A and thus, defines a shorter length than the outer wall 146, which is positioned along the outside of the curved path A. Although various implementations of silencers can be incorporated into the outlet chute 130 (e.g., including any one or any combination of those illustrated, among others), the outlet chute 130 is constructed so that the inner wall 144 is constructed as a first silencer 140A, and the two side walls 148 are respectively constructed as second and third silencers 140B, 140C. Along the outer wall 146, and particularly within the primary impact area X, no silencer is provided.

Figure 4:
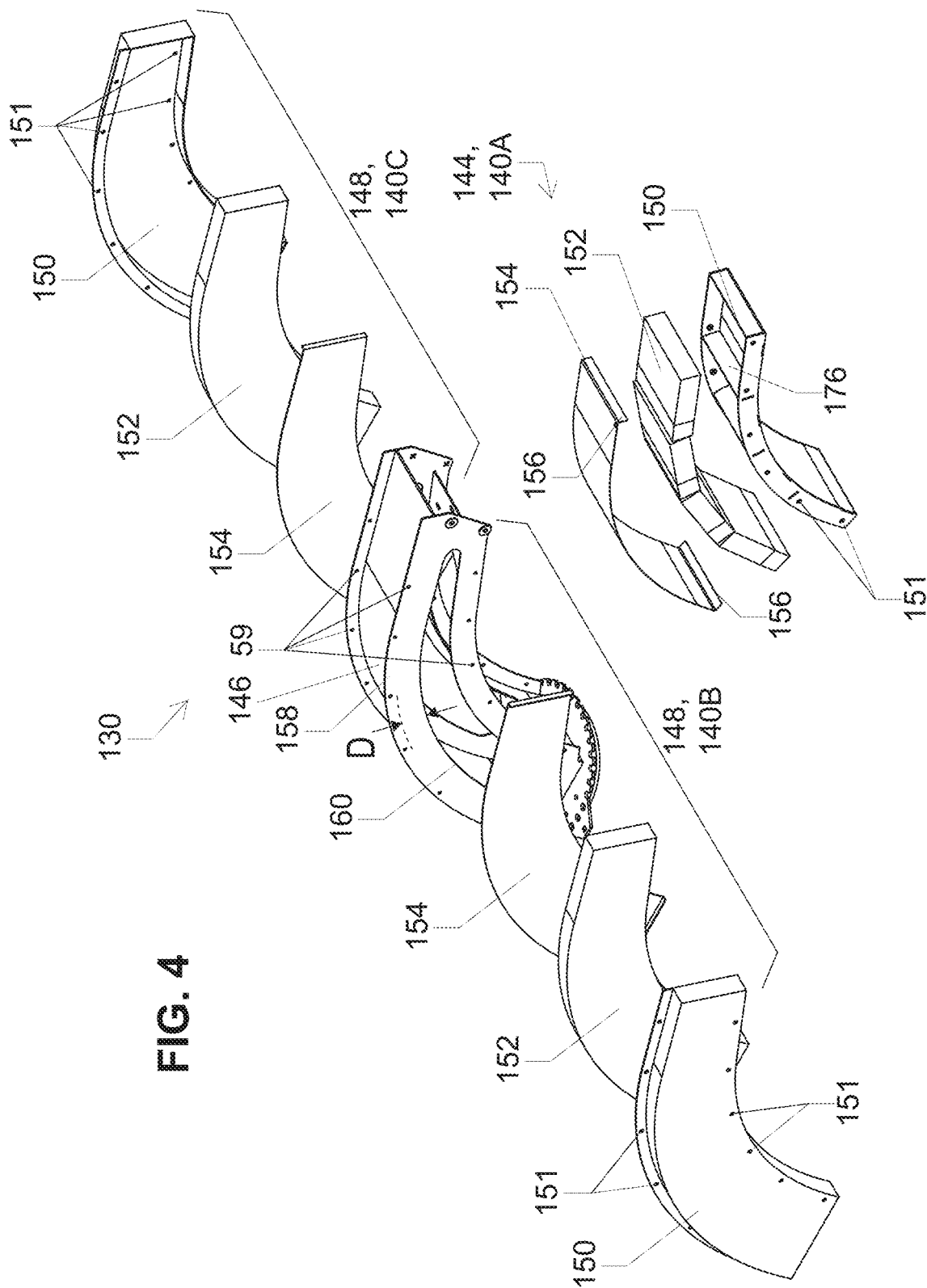
FIG. 4 is an exploded assembly view of the outlet chute of the chipper of FIG. 3, illustrating multiple integrated silencers.
Figure 9:
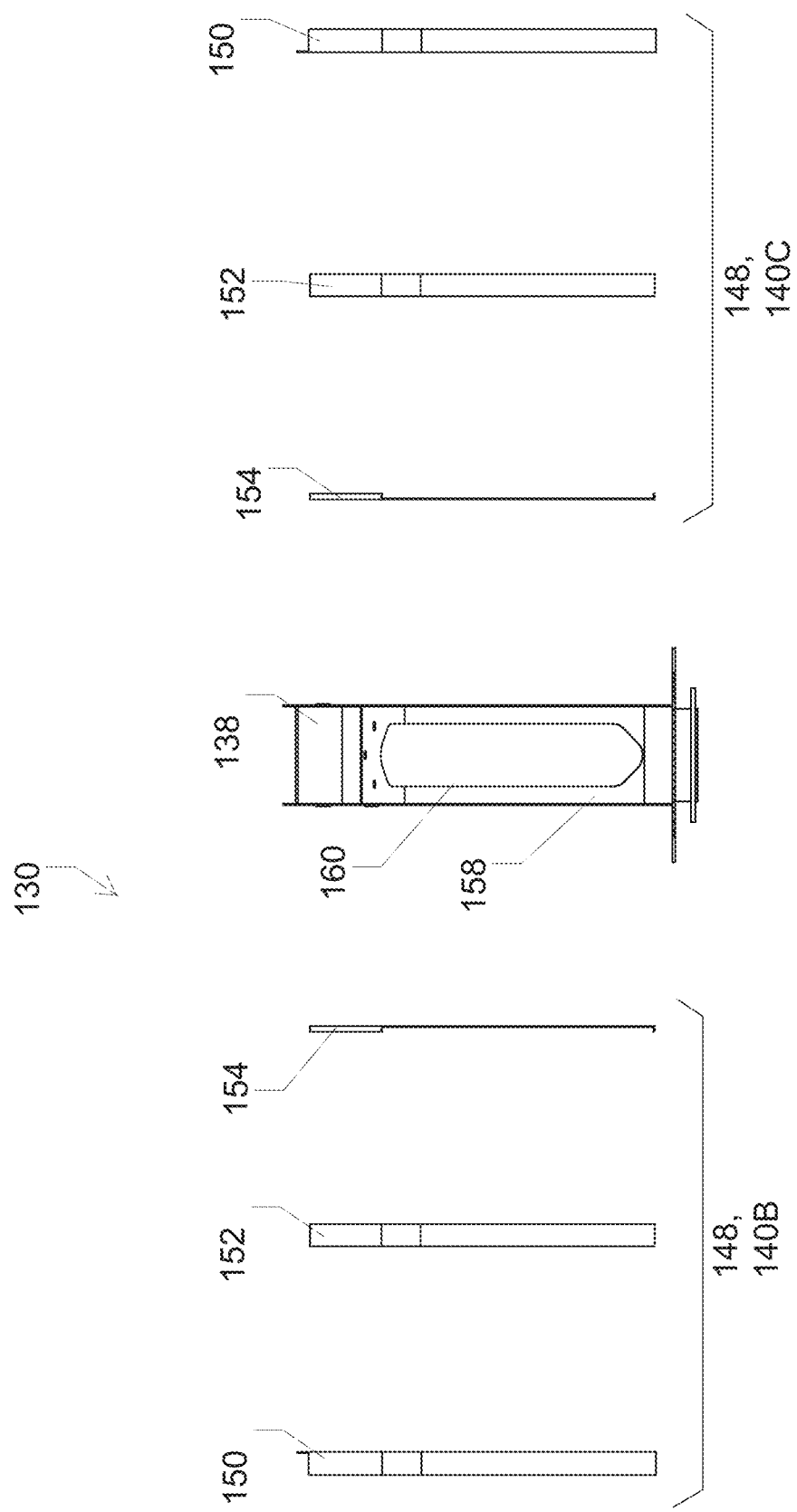
FIG. 9 is a front view of the outlet chute of FIGS. 3-8, partially exploded.
Figure 10:
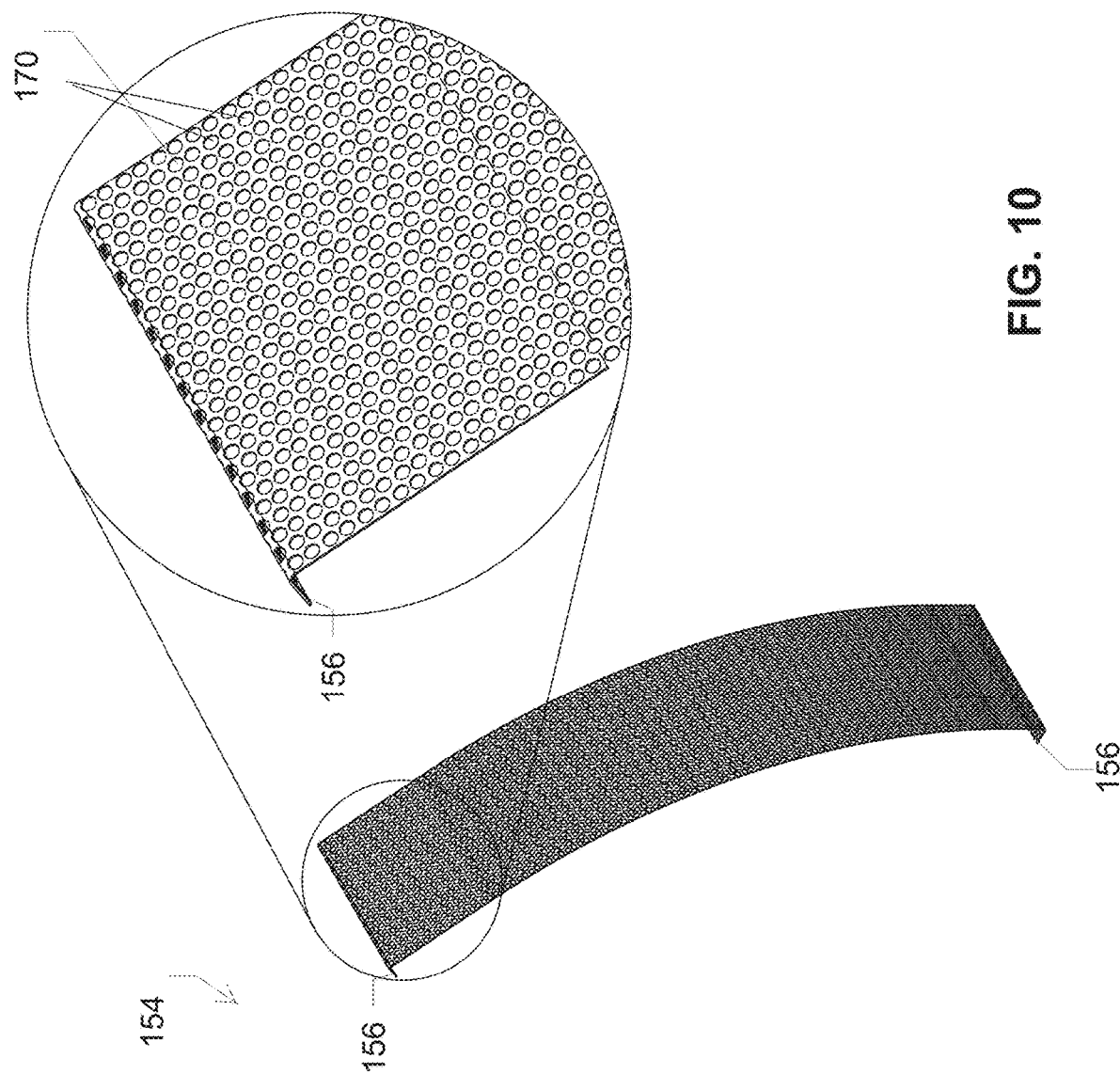
FIG. 10 is a perspective view of a perforated screen used in constructing the silencer, including a detail view thereof.

Working from exterior to interior, each silencer includes an outer panel or sheet 150 forming a pocket, a sound attenuation layer 152, and a screen layer 154. The outer panel 150 forms an exterior surface of the outlet chute 130. The screen layer 154 is a foraminous wall forming an interior surface of the outlet chute 130 so as to be in communication with or exposed to the reduced material being passed therethrough. Though discontinuous rather than solid, the screen layer 154 forms a separation layer between the material passage of the chute 130 and the sound attenuation layer 152. The screen layer 154 can be of uniform construction throughout (e.g., uniform thickness and a repeating pattern of openings 170). For example, the screen layer 154 can be entirely covered with uniformly distributed openings 170 of consistent size, although other configurations are optional. In some constructions, the screen layer 154 works in combination with an inner panel or sheet 158 to define the interior surface of the outlet chute 130. An example of this is shown along the two side walls 148 where the screen layer 154 is mounted against a solid metal inner panel 158 having a large central opening 160 therein. FIG. 4 illustrates how the screen layer 154 has an L-shaped flange 156 at each end, the flange extending around the respective top and bottom edges of the sound attenuation layer 152. The outer panel 150 can be seen in FIG. 4 to include individual pockets delineated by separators 176.

Although the silencers 140A, 140B, 140C can be fully integrated portions of the outlet chute 130, one or more of the silencers can be made removable. Any of the silencers 140A, 140B, 140C can be secured by one or more of welding, latches, threaded fasteners, etc. In the illustrated embodiment, the inner panels 158 include an array (e.g., rows) of fastener apertures 159 configured to be aligned with an array (e.g., rows) of fastener apertures 151 in the respective outer panels 150 for receiving mutual fasteners (e.g., screws). The sound attenuation and screen layers 152, 154 are held captive between the outer and inner panels 150, 158 when the fasteners are applied. It is also noted that outlet chute 130 can employ one or more of the silencers 140A, 140B, 140C in combination with one or more additional sound attenuation features, including for example a noise and vibration reduction coating (e.g., from the Mascoat Company of Houston, TX) and/or a chute liner (e.g., TIVAR® UHMW polyethylene or similar sheet). A chute liner 178 can be added on the inside of the outlet chute 130, and particularly along a portion, a majority, or all of the outer wall 146 where the material primarily comes into contact—both making initial impact and subsequently sliding along toward the outlet. The chute liner 178 is a low friction material, e.g., providing lower dynamic friction for the reduced material as compared to the material of the outer wall 146. The chute liner 178 both dampens noise from impacts, but also increases the ease at which material slides. As such the liner 178 provides reduced vibrational energy transmitted to the walled structure of the chute 130 and lower noise emitted therefrom. The low friction also serves to maintain high material velocity through the chute 130 and protect the outer wall 146 from wear.

On any given wall of the outlet chute 130 having a silencer, the screen layer 154 provides an area in which there is at least 30 percent, at least 40 percent, or even a majority of open area (e.g., up to about 80 percent) to expose the sound attenuation layer 152 to the chute interior passage through which reduced material is passed. Considering the opening 160 in the inner panel 158, the dimensional area is maximized within the limits of the required structural rigidity of the outlet chute 130, and the opening 160 can be provided as a single large opening or two or more smaller openings providing a large sound passthrough. The sound attenuation layer 152 can be provided by an acoustic absorption material, and/or provided with a labyrinth damping structure such as a muffler with a plurality of walls and chambers providing a plurality of directional changes for reflecting and canceling sound waves during passage therethrough. In some constructions, the sound attenuation layer 152 can be provided by a continuous acoustic foam sheet or a plurality of acoustic foam blocks configured to fit into the pocket in the outer panel 150, which acts as a housing. Each outer panel 150 can include one or more pockets or compartments to hold the acoustic foam material. The sound attenuation layer 152 can include an acoustic foam and/or an acoustic barrier, e.g., one or more of the POLYDAMP® products available from Polymer Technologies, Inc. and detailed at https://www.polytechinc.com/products/acoustic-foam or https://www.polytechinc.com/products/acoustic-barriers.

The screen layer 154 can take various constructions, for example a solid metal sheet provided with numerous apertures, or alternately a mesh of metal wires woven and/or bonded together. As mentioned above, the screen layer 154 may be formed as a sheet having a substantial percentage of open space as viewed perpendicular to the sheet direction. Increasing the percentage of open space as much as possible maximizes the ability for noise attenuation by passing as much sound energy as possible into the sound attenuation layer 152 rather than reflecting it within. In some constructions, the screen layer 154 is expanded metal made by slitting and stretching a metal sheet (e.g., see examples at https://www.mcnichols.com/expanded-metal), or alternately non-metallic such as polymeric material (e.g., UHMW polymer). However, the screen layer 154 directly bounds the passage through which the reduced material is passed, and so it must be designed to be suitably durable and wear resistant. Not only does the material type, thickness, and amount of open space need to render the screen layer 154 durable, but also the size and arrangement of openings in the screen layer 154 must be considered and carefully selected to as to allow extended service time without caking up of the screen layer with the reduced material, which may most commonly be small wood fragments, chips, etc. In some constructions, as shown in the detail view of FIG. 10, the screen layer 154 may consist of openings 170 (e.g., circular, oval, etc.) having no corners therein, such that material is less likely to get caught up in the screen layer 154. The openings 170 may have a maximum transverse width (e.g., diameter) of less than ½ inch (e.g., 0.250 inch). In some constructions, the openings 170 can be hex shaped to further maximize open space, and the hex openings can optionally include rounded corners. The size of the individual openings 170, whether uniform or of multiple different sizes, may be selected based on the expected size of individual particles expected to be produced from the processing portion 120. One example material for the screen layer 154 is a 5/64-inch hole on 7/64-inch staggered centers. This perforated metal material, which has 46 percent open area, is available as a cold rolled carbon steel (20 ga.) from McNichols Co. Inc., Tampa, FL, details of which can be found at https://www.mcnichols.com/perforated-metal. Other examples for round openings 170 include 63 percent open area with a 5/32-inch round hole on 3/16-inch staggered centers, and a 5/16-inch round hole on 3/8-inch staggered centers. Using the same pattern, but changing to hex shaped openings 170 can expand the open area up to 79 percent. On the smaller side, a 0.027 inch opening may be used, yielding 23 percent open area. On the other hand, in some constructions, there is no layer between the sound attenuation layer 152 and the interior of the outlet chute 130.

Figure 19:
FIG. 19 is a schematic view of material flow through the outlet chute along a perforated screen layer.
Figure 19:
Figure 20:
FIG. 20 is a schematic view of material flow through the outlet chute along a louvered screen layer.
Figure 20:

FIG. 19 illustrates a schematic representation of the flow of material, which is parallel to or along the screen layer 154 within the outlet chute 130. The material flow is substantially along the discharge path A as noted above. The screen layer 154 is shown in one foraminous configuration, which includes perforations in a direction substantially perpendicular to the direction of the material flow. FIG. 20 represents a similar schematic in which the screen layer 154 has an alternate foraminous configuration, one that includes louver openings. Such a screen layer 154 can be constructed by stamping a sheet (e.g., of metal) or other available methods. As shown, the louvered screen layer 154 can be arranged such that the louvers, and the passages created therebetween, are angled in the direction of the material flow such that the material would be forced to reverse course in order to pass through the screen layer 154. Thus, in practice, material contacting the louvers is redirected generally toward the material flow path.

As will be appreciated from FIGS. 4-5, one way in which to further reduce the likelihood for catching or trapping reduced material in the outlet 130 is to avoid placing any silencer along the outer wall 146. The outer wall 146 may be provided by a continuous solid surface along which reduced material travels when turning the corner imparted by the chute path A. Although reduced material may have some limited contact with the other walls 144, 148, the outer wall 146, which forms the upper wall as oriented on the chipper 100, constitutes a primary contact surface responsible for redirection of the reduced material. Thus, the placement of silencer(s) 140A, 140B, 140C along the other walls 144, 148 may provide substantial noise output reduction while minimizing potential degradation in performance or longevity. In some constructions, silencer(s) are only positioned along the inside of the path A (FIGS. 14-18). In constructions having side-mounted silencers 140B, 140C, the open space does not extend all the way to the outer wall 146 but rather a spacing distance is provided to further prevent reduced material from getting caught. For example, the open space is positioned so that (e.g., at its nearest portion) it is offset a distance D (FIG. 4) of at least 2 inches away from the outer wall 146, or in some constructions at least 3 inches away from the outer wall 146. The opening 160 can include an edge extending parallel to the outer wall 146 and parallel to the path A such that a constant distance is maintained from the outer wall 146 to a top or outermost edge of the opening 160 that communicates with the silencer 140B, 140C, although other configurations are optional. It is also noted herein that one or more silencers 140A, 140B, 140C may be provided without any separation layer (e.g., screen layer 154) between the sound attenuation layer 152 and the material passage of the chute 130 due to placement at location(s) away from the primary travel path of reduced material through the chute 130.

Figure 18:
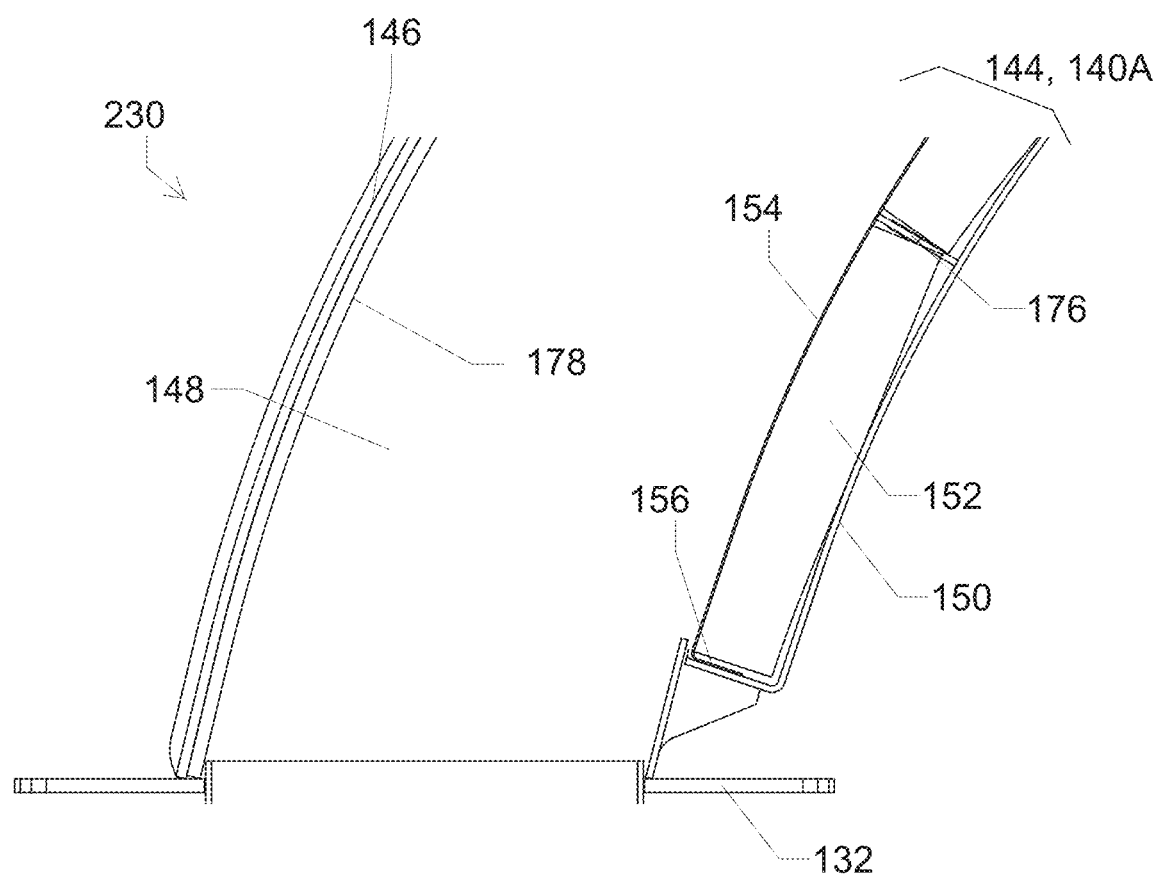
FIG. 18 is a detail view of the bottom portion of the outlet chute as shown in FIG. 15.

As mentioned briefly above, FIGS. 14-18 illustrate an outlet chute 230 that is similar in most respects to the outlet chute 130 described above, and as such the above description and drawings are referenced for the bulk of the features thereof. However, along the majority or the entirety of the length of the chute 230 between the joint 132 and the discharge deflector 138 (not shown in FIGS. 14-18), the side walls 148 are solid continuous walls with no silencers and thus no open space communicating therewith. The silencer 140A extends along the inner wall 144, and this alone provides a notable reduction in emitted sound compared to a similar chipper and outlet chute without the silencer 140A. Construction of the outlet chute 230 is simplified as compared to the outlet chute 130, as the side walls 148 have a basic one-piece sheet construction and there are overall less components and less material for the sound attenuation layer 152. Thus, any increase in production cost is kept relatively minimized. Even the basic single silencer outlet chute 230 can provide a reduction in sound level as observed in initial testing with production chippers. A difference of 0.7 dB(A), or a 15 percent reduction in sound power was observed during chipping. An even more significant change in sound power is observed when running but not actively chipping, as the silenced outlet chute 230 reduced the overall sound power by 2.3 dB(A), or 41 percent. The detail view of FIG. 18 illustrates multiple acoustic foam blocks that make up the sound attenuation layer 152. This view also shows the lower flange 156 of the screen layer 154, the flange extending around the bottom edge of the sound attenuation layer 152 and into the pocket formed by the outer panel 150.

Figure 11:
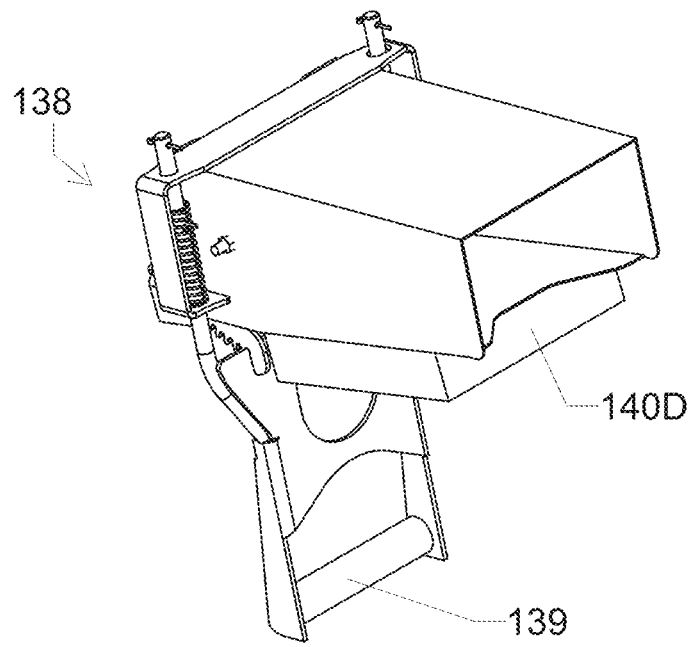
FIG. 11 is a perspective view of a discharge deflector of the outlet chute, incorporating a silencer.
Figure 12:
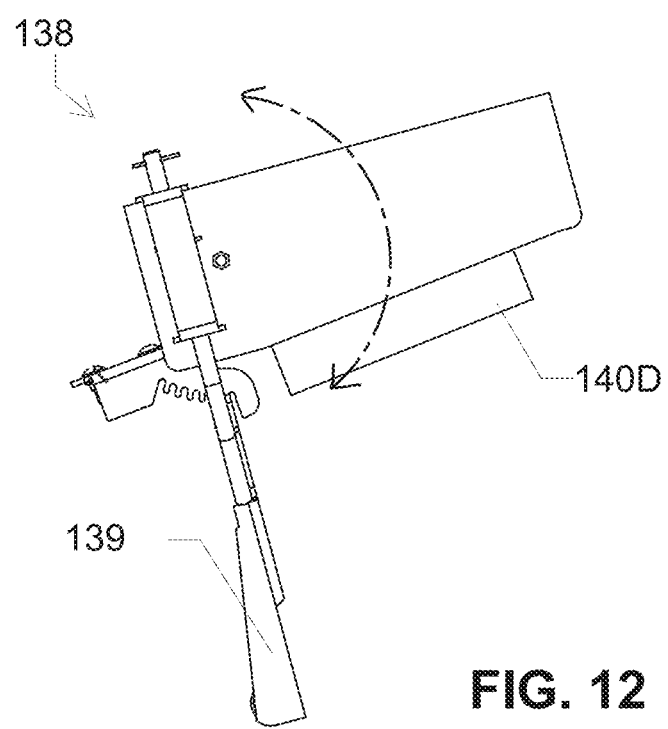
FIG. 12 is a side elevation view of the discharge deflector of FIG. 11.
Figure 13:
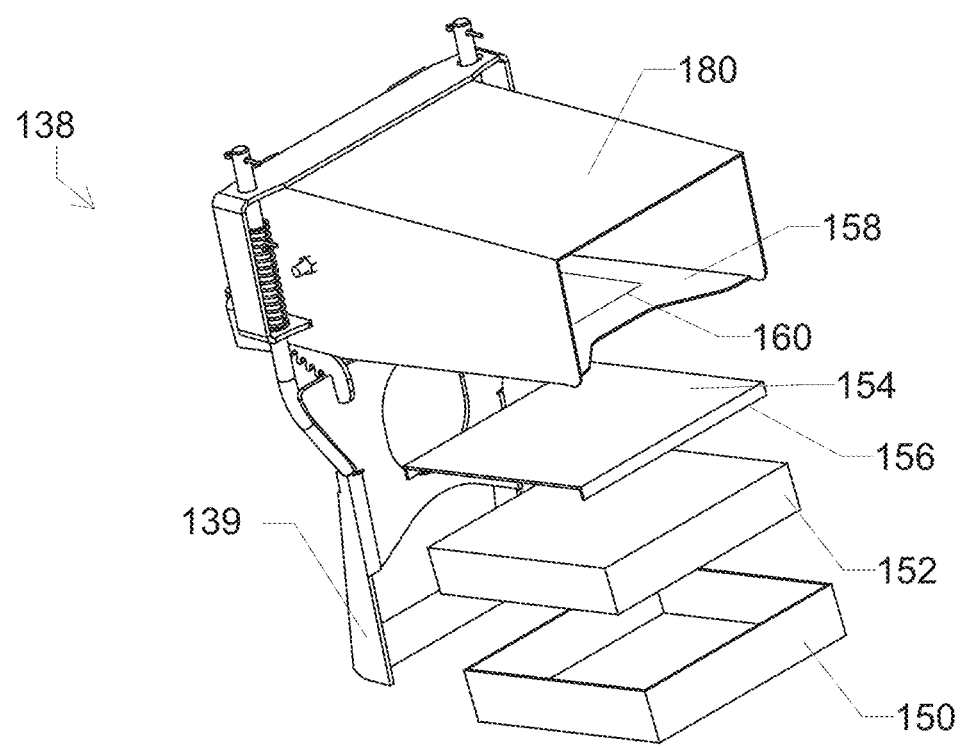
FIG. 13 is an exploded assembly view of the discharge deflector of FIG. 11.
Figure 15:
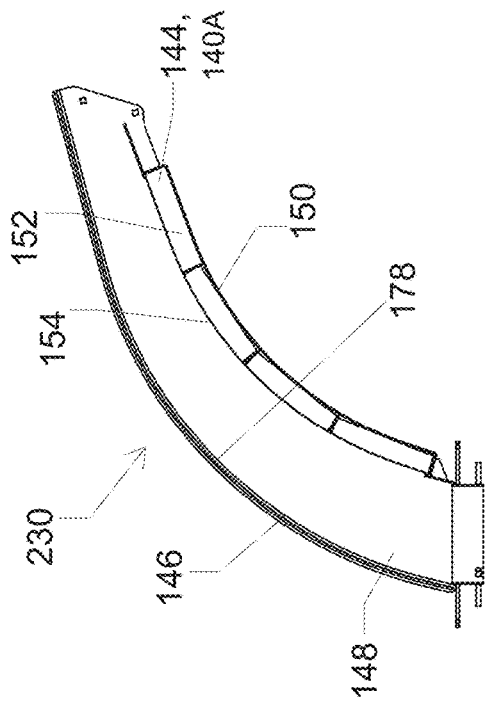
FIG. 15 is a side view of the outlet chute of FIG. 14 with a side wall removed to illustrate the silencer.
Figure 17:
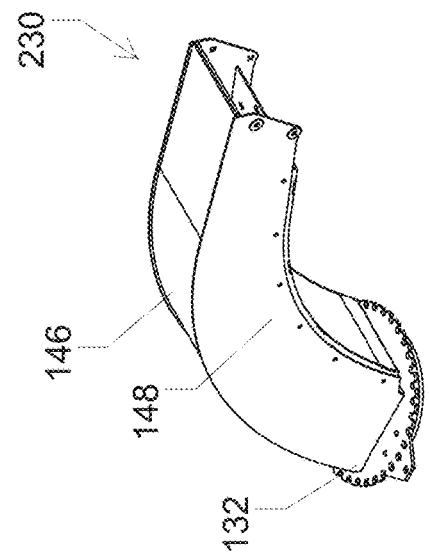
FIG. 17 is a perspective view of the outlet chute of FIG. 14, taken from above.
Figure 14:
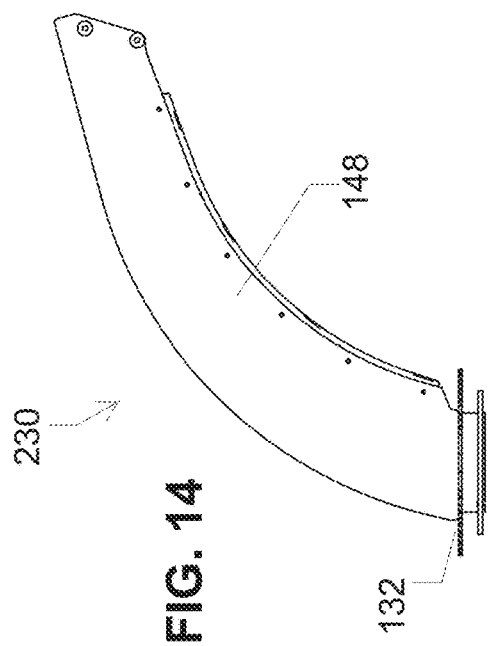
FIG. 14 is a side elevation view of an outlet chute according to a second embodiment of the present disclosure.
Figure 16:
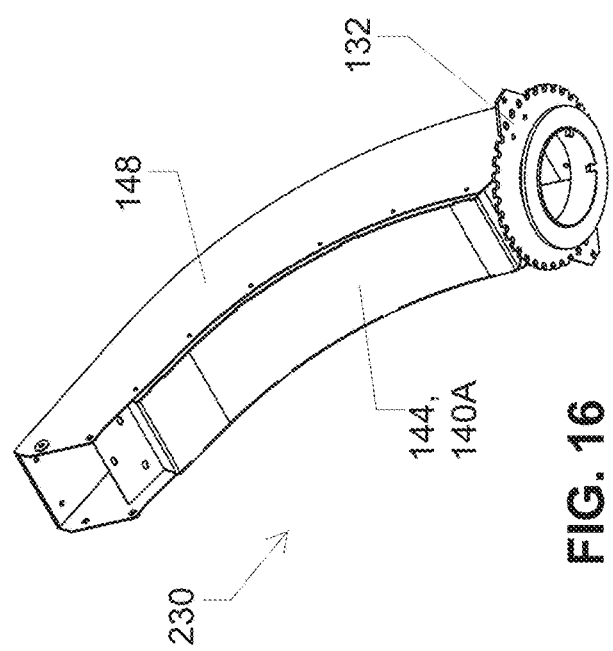
FIG. 16 is a perspective view of the outlet chute of FIG. 14, taken from below.

Regardless of which walls of the outlet chute 130 do or do not include silencers, there is also disclosed the option to incorporate a silencer 140D at the distal end of the chute 130, as part of the discharge deflector 138. This is shown in the drawings of the entire chute 130, and further illustrated in isolation in FIGS. 11-13. Although reconfigured to a smaller package that fits the discharge deflector 138, the silencer 140D can conform to the general construction of those described above—including an outer panel 150 forming a pocket, a sound attenuation layer 152, and a screen layer 154 overlying an opening 160 in an inner panel 158. Although the sound attenuation layer 152 can take a variety of constructions, it may be formed by a single acoustic foam block. Overall, due to the straight material passage formed by the walls of the discharge deflector 138, the silencer 140D can have a flat shape when viewed from the side, rather than a curved shape. Considering the overall chute 130 shape, the silencer 140D is positioned to the radially interior side of the path A, consistent with the silencer 140A, and opposite a primary deflector wall 180 of the discharge deflector 138. The primary deflector wall 180 is adjustable toward the path A at a variety of angles for redirecting material flowing along the outer wall 146 of the chute 130.

Figure 22:
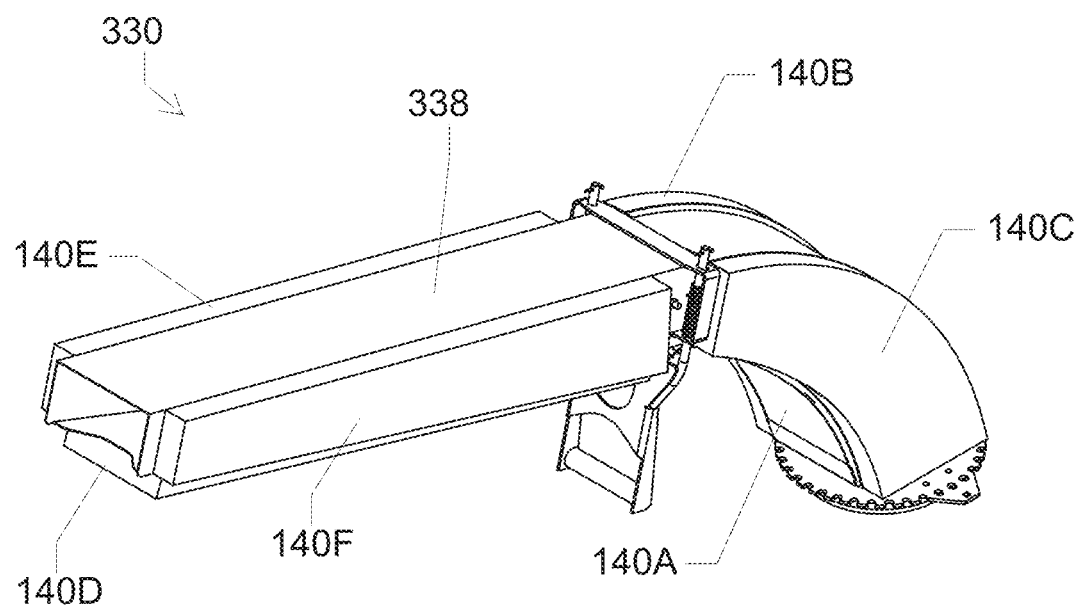
FIG. 22 is a perspective view of an outlet chute according to a third embodiment of the present disclosure.
Figure 23:
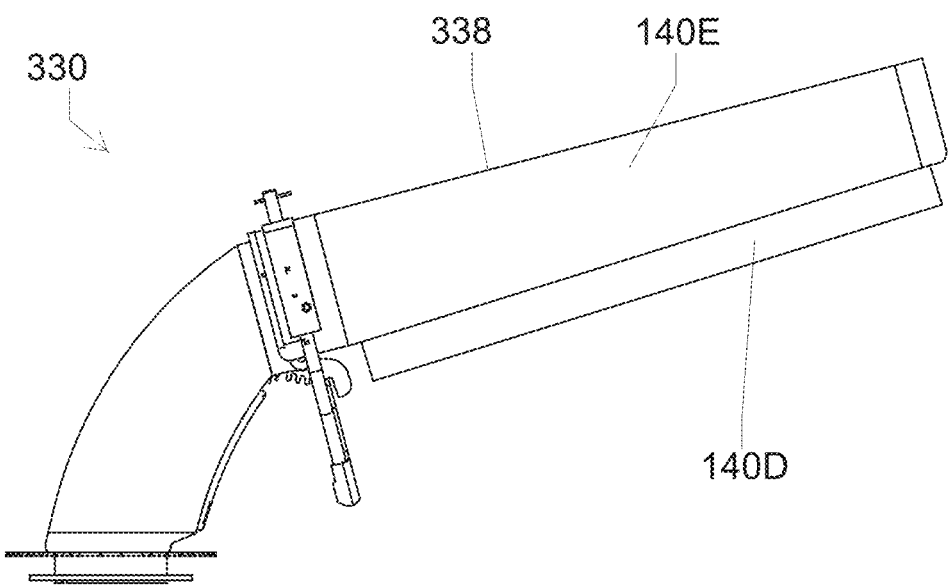
FIG. 23 is a side elevation view of the outlet chute of FIG. 22.

FIGS. 22 and 23 illustrate a further variation of an outlet chute 330 according to another embodiment of the present disclosure. In this embodiment, the discharge deflector 338 is enlarged compared to the discharge deflector 138 and makes up a larger percentage of the overall outlet chute. In particular, the portion of the length of the outlet chute 330 made up by the discharge deflector 338 can be at least 30 percent, at least 40 percent, or even 50 percent or more. By making a larger portion of the outlet chute's overall length to be made up by the discharge deflector 338, a transportation height of the chipper 100 can be reduced, since the discharge deflector 338 can be folded downward for transportation between sites. Although the outlet chute 330 is shown with the silencers 140A, 140B, 140C, it is also conceived to have silencer(s) provided exclusively on the adjustable discharge deflector 338, and not on the remaining base portion of the outlet chute 330. The silencers on the discharge deflector 338 can include a silencer 140D on the bottom or inside of the curved discharge path, a silencer 140E on a first lateral side of the discharge deflector 338, and a silencer 140F on a second lateral side of the discharge deflector 338. These silencers can be provided singly or in any combination on the discharge deflector 338.

Any or all of the silencers, or individual portions thereof (e.g., screen layer, sound attenuation layer), can be configured to be removable and replaceable. By this it is meant that the construction and assembly thereof promotes rather than precludes disassembly of the parts (without destructive means) for the purpose of servicing, cleaning, or outright replacement of the parts. Thus, although the silencers are integrated with the outlet chute 130 as opposed to simply an add-on wrap for example, they are not integrated in a way that renders their internal parts permanent or non-serviceable.

Although the invention has been described in detail with reference to certain preferred embodiments, variations and modifications exist within the scope and spirit of one or more independent aspects of the invention as described.

The invention claimed is:

1. A material reduction machine comprising:
an infeed portion operable to receive material to be reduced;
a cutting mechanism operable to reduce material fed in from the infeed portion; and
an outlet chute having a first end operable to receive the material reduced by the cutting mechanism and a second end operable to discharge the reduced material from the machine, wherein the outlet chute extends upwardly from the first end to the second end along a curved path,
wherein the cutting mechanism has vanes or paddles configured to forcibly blow reduced material upward and outward into the outlet chute, and
wherein the outlet chute includes, along a radially-inner side of the curved path, a foraminous interior wall providing communication with a sound attenuation layer, and wherein the foraminous interior wall is opposite an outer wall of the outlet chute that defines a primary impact area for reduced material blown from the cutting mechanism along a radially-outer side of the curved path.

2. The material reduction machine of claim 1, wherein the outer wall of the outlet chute includes a continuous, solid wall.

3. The material reduction machine of claim 1, wherein at least one lateral side of the outlet chute includes a further sound attenuation layer.

4. The material reduction machine of claim 1, wherein the material reduction machine is a brush chipper having a plurality of comminution knives.

5. The material reduction machine of claim 1, further comprising a discharge deflector positionable at a plurality of angles at the second end of the outlet chute.

6. The material reduction machine of claim 1, further comprising one or both of: a vibration and noise reduction coating and a liner applied to at least a portion of the outlet chute.

7. The material reduction machine of claim 1, wherein the cutting mechanism includes a rotatable drum having a plurality of knives for reducing the material fed in from the infeed portion.

8. The material reduction machine of claim 1, wherein the foraminous interior wall is provided by a perforated or louvered metal sheet.

9. The material reduction machine of claim 1, wherein the foraminous interior wall is removable from the outlet chute without destructive means for the purpose of servicing, cleaning, or outright replacement.

10. The material reduction machine of claim 1, wherein the sound attenuation layer is removable from the outlet chute without destructive means for the purpose of servicing, cleaning, or outright replacement.

11. The material reduction machine of claim 1, wherein at least one lateral side of the outlet chute provides communication with a further sound attenuation layer, and wherein no openings in the at least one lateral side to provide the communication with the further sound attenuation layer are within 2 inches from the outer wall.

12. A material reduction machine comprising:
an infeed portion operable to receive material to be reduced;
a cutting mechanism operable to reduce material fed in from the infeed portion; and
an outlet chute having a first end operable to receive the material reduced by the cutting mechanism and a second end operable to discharge the reduced material from the machine, wherein the outlet chute extends upwardly from the first end to the second end along a curved path,
wherein the cutting mechanism has vanes or paddles configured to forcibly blow reduced material upward and outward into the outlet chute, and
wherein at least one lateral side of the outlet chute includes a foraminous interior wall providing communication with a sound attenuation layer, and wherein the foraminous interior wall is adjacent an outer wall of the outlet chute that defines a primary impact area for reduced material blown from the cutting mechanism along a radially-outer side of the curved path.

13. The material reduction machine of claim 12, wherein the outer wall of the outlet chute includes a continuous, solid wall.

14. The material reduction machine of claim 12, wherein, along a radially-inner side of the curved path, the outlet chute includes a further sound attenuation layer.

15. The material reduction machine of claim 12, wherein the material reduction machine is a brush chipper having a plurality of comminution knives.

16. The material reduction machine of claim 12, further comprising a discharge deflector positionable at a plurality of angles at the second end of the outlet chute.

17. The material reduction machine of claim 12, further comprising one or both of: a vibration and noise reduction coating and a liner applied to at least a portion of the outlet chute.

18. The material reduction machine of claim 12, wherein the cutting mechanism includes a rotatable drum having a plurality of knives for reducing the material fed in from the infeed portion.

19. The material reduction machine of claim 12, wherein the foraminous interior wall is provided by a perforated or louvered metal sheet.

20. The material reduction machine of claim 12, wherein the foraminous interior wall is removable from the outlet chute without destructive means for the purpose of servicing, cleaning, or outright replacement.

21. The material reduction machine of claim 12, wherein the sound attenuation layer is removable from the outlet chute without destructive means for the purpose of servicing, cleaning, or outright replacement.

22. The material reduction machine of claim 12, wherein no openings in the at least one lateral side to provide the communication with the sound attenuation layer are within 2 inches from the outer wall.

23. A material reduction machine comprising:
an infeed portion operable to receive material to be reduced;
a cutting mechanism operable to reduce material fed in from the infeed portion; and
an outlet chute having a first end provided by a base portion of the outlet chute and operable to receive the material reduced by the cutting mechanism and a second end operable to discharge the reduced material from the machine, wherein the outlet chute extends along a curved path,
wherein the cutting mechanism has vanes or paddles configured to forcibly blow reduced material upward and outward into the outlet chute, wherein at the second end, the outlet chute includes a discharge deflector that is angle-adjustable with respect to the base portion to adjust the trajectory of the reduced material discharged therefrom, and wherein the discharge deflector includes an integrated silencer.

* * * * *